United States Patent
Kirchev et al.

(10) Patent No.: US 8,173,300 B2
(45) Date of Patent: May 8, 2012

(54) ACID-LEAD BATTERY ELECTRODE COMPRISING A NETWORK OF PORES PASSING THERETHROUGH, AND PRODUCTION METHOD

(75) Inventors: Angel Zhivkov Kirchev, Aix-les-Bains (FR); Nina Kircheva, Aix-les-Bains (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 13/256,322

(22) PCT Filed: Mar. 23, 2010

(86) PCT No.: PCT/EP2010/053771
§ 371 (c)(1),
(2), (4) Date: Sep. 13, 2011

(87) PCT Pub. No.: WO2010/115705
PCT Pub. Date: Oct. 14, 2010

(65) Prior Publication Data
US 2012/0003543 A1 Jan. 5, 2012

(30) Foreign Application Priority Data
Apr. 6, 2009 (FR) .................... 09 01666

(51) Int. Cl.
*H01M 4/36* (2006.01)
*H01M 4/56* (2006.01)
*H01M 4/58* (2010.01)
*H01M 4/72* (2006.01)
*H01M 4/74* (2006.01)

(52) U.S. Cl. ............... 429/226; 429/225; 429/218.1; 429/211; 429/233; 429/241

(58) Field of Classification Search .......... 429/226, 429/225, 218.1, 211, 233, 241
See application file for complete search history.

(56) References Cited

U.S. PATENT DOCUMENTS

| | | |
|---|---|---|
| 3,825,406 A | 7/1974 | Heath |
| 5,451,444 A | 9/1995 | DeLiso et al. |
| 7,060,391 B2 | 6/2006 | Gyenge et al. |
| 2005/0084737 A1 | 4/2005 | Wine et al. |
| 2005/0191555 A1 | 9/2005 | Kelley et al. |
| 2006/0292448 A1 | 12/2006 | Gyenge et al. |

FOREIGN PATENT DOCUMENTS

| | | |
|---|---|---|
| DE | 2 203 592 | 11/1972 |
| DR | 2 203 592 | 11/1972 |
| EP | 0 856 900 A2 | 8/1998 |
| WO | WO 01/15792 A1 | 3/2001 |

(Continued)

OTHER PUBLICATIONS

Butler et al., "Zinc/Bromine Batteries," *Handbook of Batteries*, Chapter 39, pp. 39.1-39.22, 3rd Ed, 2002.

(Continued)

*Primary Examiner* — Helen O Conley
(74) *Attorney, Agent, or Firm* — Oliff & Berridge, PLC

(57) ABSTRACT

A structure including a network of parallel, homogeneous pores extending through the structure, and an outer frame around the lateral faces of the structure. The structure and the frame are made of carbon. The electrode is covered by a layer based on lead. The pores are filled with an active material based on lead.

11 Claims, 3 Drawing Sheets

FOREIGN PATENT DOCUMENTS

WO  WO 2006/105188 A1  10/2006

OTHER PUBLICATIONS

Butler et al., "Zinc/Bromine Batteries," *Handbook of Batteries*, Chapter 39, pp. 39.I-39.22, 3rd Ed, 2002.

Jun. 9, 2010 International Search Report issued in International Application No. PCT/EP2010/053750.

Gyenge et al., "Electroplated Reticulated Vitreous Carbon Current Collectors for Lead-Acid Batteries: Opportunities and Challenges," Journal of Power Sources, vol. 113, pp. 388-395, 2003.

Faber, "The Use of Titanium in the Lead Acid Battery," Power Sources 4, ed. D.H. Collins, pp. 525-538, 1973.

Bode, "Lead-Acid Batteries," John Wiley & Sons, pp. 150-159, 1977.

Takahashi et al., "Physical Changes in Positive Active Mass During Deep Discharge-Charge Cycles of Lead-Acid Cell," J. Electrochem. Soc., vol. 130, No. 11, pp. 2144-2149, 1983.

U.S. Appl. No. 13/255,680 filed in the name of Angel Zhirkov Kirchev et al. filed Sep. 9, 2011.

Oct. 18, 2011 International Preliminary Examination Report and Written Opinion issued in International Application No. PCT/EP2010/053750.

Oct. 18, 2011 International Preliminary Examination Report and Written Opinion issued in International Application No. PCT/EP2010/053771.

ACID-LEAD BATTERY ELECTRODE COMPRISING A NETWORK OF PORES PASSING THERETHROUGH, AND PRODUCTION METHOD

BACKGROUND OF THE INVENTION

The invention relates to a lead-acid battery electrode comprising at least one carbon-based porous structure with parallel main faces and lateral faces surrounded by an outer frame, the porous structure, covered by a lead or lead-based alloy layer, being filled with a lead-based paste.

The invention also relates to a method for production of such an electrode.

STATE OF THE ART

Lead-acid batteries are generally formed by a stack of electrochemical cells. Each cell comprises two electrodes each comprising a porous current collector, also called grid, and a lead-based or lead dioxide-based active material, as well as a sulphuric acid-based electrolyte.

The main problem of lead-acid batteries is their low energy density. In the case of Valve-Regulated Lead-Acid Batteries (VRLAB), the energy density is 30 to 40 Wh/kg, whereas the theoretical value of this type of battery is 167 Wh/kg. Two reasons explain the difference between the theoretical value and the actual value of the energy density. Firstly, the battery current collectors, which also act as mechanical support for the active materials (porous lead-based paste and porous lead oxide-based paste) are in general made from lead (metal), which considerably increases the weight of such a battery. Secondly, the utilisation factor of an active material, which represents the part of the active material which reacts electrochemically, is low. It varies between 40 and 50% depending on the type of material used for the positive current collector or the negative current collector and depending on its geometry (collectors in the form of plates, tubular, flat or bipolar collectors). Two phenomena in general limit the efficiency of the active materials:

during discharging of the battery, a part of the active material undergoes a sulphation phenomenon, which significantly increases the ohmic resistance of the active material and decreases the use of non-sulphated material. A study of this phenomenon is for example reported in the article "The use of titanium in lead-acid batteries" (Power Sources 4, ed. D.H. Collins, 1973, pp. 525-538) by Faber for a titanium current collector and lead dioxide used as positive active material.

discharging consumes electrolyte. The electrolyte enters the space situated between the two electrodes of the cell and infiltrates into the pores of the current collectors. The parts of the active material situated far from the surface of the current collectors therefore do not receive any electrolyte and do not participate in the reactions, as described by Bode in the article "Lead-Acid Batteries" (John Wiley & Sons, 1977, pp. 156-159).

Comparison of these two phenomena limiting the use of the active material therefore indicates that the geometry of the current collectors, in general in the form of a grid, is the major factor limiting the performances of the battery.

U.S. Pat. No. 7,060,391 proposes to replace the traditional lead current collectors by very porous carbon collectors in order to improve the energy density of the battery. These collectors are formed by carbon foams such as Reticulated Vitreous Carbons (RVC). The pores of these foams are filled with active materials enabling the chemical reactions. The size of the pores being smaller than 1 mm, this enables an utilisation factor of up to 70% to 80% to be obtained. In spite of this advantage, the use of these foams remains limited on account of the following problems:

the large porosity of these foams (95% vacuum) greatly increases the electric resistance. Solutions which add a lead frame and connector around the foam to collect the current increase the weight of the electrode and thereby decrease the energy density of the battery. These methods are moreover costly because they require specific equipment, the irregular structure of the foam makes the step of spreading the active material paste difficult. A paste arranged in non-homogeneous manner in the pores of the foam reduces the use of the active material and the life expectancy of the battery.

Furthermore, during a charge-discharge cycle, and especially in the course of a deep discharge cycle, the volume of the electrodes varies greatly on account of the difference of the molar volumes between the lead sulphate and the lead/lead dioxide. The mechanical stresses generated cause progressive degradation of the battery, in particular of the active material of the positive electrode. The active material in fact breaks down and detaches itself from the grid. This problem is solved by using separators made from microporous glass fibers also known under the abbreviation AGM (standing for Absorptive Glass Mat). A sheet of AGM type is solidly secured between the two electrodes exerting a compressive force on them. This compression prevents degradation of the active material caused by the change of volume and increases the lifetime of the battery, as shown by Takahashi et al. ("Physical Changes in Positive Active Mass during Deep Discharge-Charge Cycles of Lead-Acid Cell", J. Electrochem. Soc., Vol. 130, pp. 2144-2149, 1983). However, this technology is not applicable to current collectors made from carbon foams, such as RVC or carbon/graphite, as compression would cause breaking of the material. In the absence of separators of AGM type, carbon foams do however have a short lifetime.

OBJECT OF THE INVENTION

The object of the invention is to provide an electrode for a lead-acid battery comprising at least one carbon-based porous structure with parallel main faces and lateral faces surrounded by an outer frame, the porous structure, covered by a layer of lead or lead-based alloy, being filled with a lead-based paste, and which remedies the shortcomings of the prior art. More particularly, the object of the invention is to provide an electrode that is compact, light, solid and easy to produce, enabling production of batteries with a high energy density.

According to the invention, this object is achieved by the fact that the structure comprises an ordered network of homogeneous through-pores perpendicular to said main faces, and by the fact that the outer frame is carbon-based and is covered by a lead or lead-based alloy layer.

It is a further object of the invention to provide a production method of such an electrode that is easy to implement.

This object is achieved by the fact that the method successively comprises:

production of a temporary support comprising said ordered network of pores, impregnated with at least a first carbon-based thermosetting resin, formation of the outer frame around said temporary support, by moulding of a mixture comprising at least a second carbon-based thermosetting resin, and hardening of said mixture, slicing the assembly formed by the temporary support surrounded by the outer frame, heat treatment in an inert atmosphere of said assembly, carbonizing the materials of the assembly, deposition of a layer of lead or lead-based alloy on all the surfaces of the assembly, filling the pores of the porous structure obtained after heat treatment with a lead-based paste constituting the active material of the battery.

BRIEF DESCRIPTION OF THE DRAWINGS

Other advantages and features are will become more clearly apparent from the following description of particular embodiments of the invention given for non-restrictive example purposes only and represented in the appended drawings, in which.

DESCRIPTION OF PARTICULAR EMBODIMENTS

Figure 1:
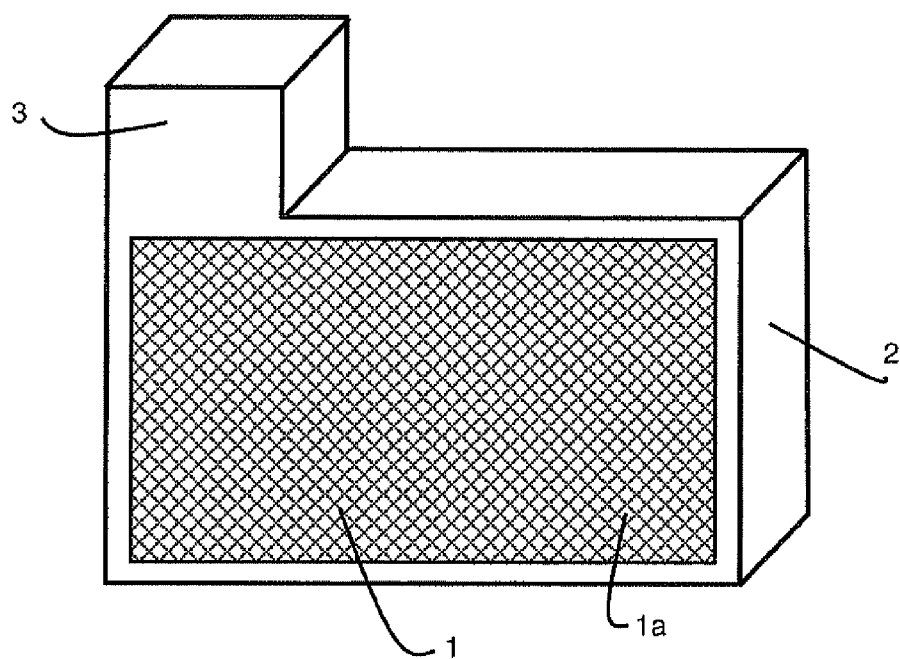
FIG. 1 represents a particular embodiment of a lead-acid battery electrode according to the invention.

FIG. 1 represents a particular embodiment of an electrode for a lead-acid battery according to the invention. The electrode comprises a structure 1 provided with a network of pores 1a passing through the structure, from one main face to the other. Pores 1a are perpendicular to the main faces of the grid. They are preferably all identical and separated by thin walls of low porosity (porosity: 5-10%). The cross-section of each pore 1a can be of any type: circular, hexagonal, square, rectangular, etc. Furthermore, a lead-based paste designed to form the active material associated with said electrode fills pores 1a of structure 1. The network formed in this way is preferably a regular network, for example in the form of a honeycomb.

The lateral faces of structure 1 are further covered by an outer frame 2, which is advantageously bulky, i.e. compact and as little porous as possible.

Outer frame 2 surrounding structure 1 comprises, in particular in FIG. 1, a connection part 3, formed for example by a salient element. Structure 1 and outer frame 2 are carbon-based, preferably vitreous carbon. Such an electrode prevents the advantage of being light and solid. Another advantage of the porous structure of the electrode according to the invention is the remarkable active surface of the current collector. The ratio between the mass of active material and the surface of the collector is greatly reduced with this grid, which means that the lifetime of these electrodes is long. Finally, an electrode according to the invention is furthermore easy to produce.

Figure 2:
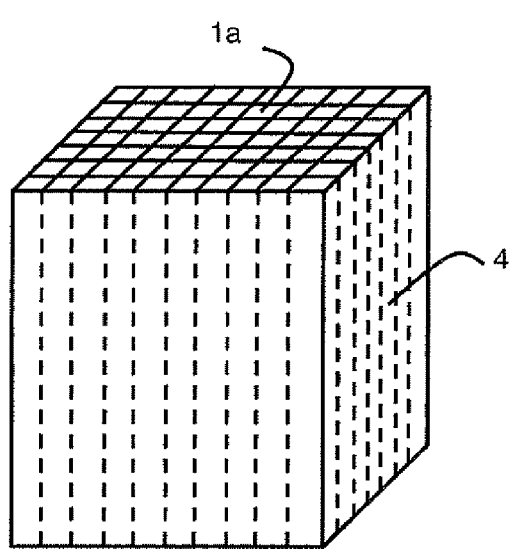
FIGS. 2 and 3 represent different steps of a production method of electrodes according to FIG. 1.

The electrode can thus be produced by means of a production method that is easy to implement, using a temporary support. Tubes, for example made from paper, are impregnated with at least one carbon-based thermosetting resin and are then arranged to form an impregnated temporary support 4, as illustrated in FIG. 2. Temporary support 4 comprises a network of pores 1a corresponding to the space delineated by the walls of the paper tubes. In FIG. 2, the temporary support is thus formed by an assembly of rectangular cross-section, formed by 70 tubes of square cross-section which are all identical.

Furthermore, the resin used to impregnate temporary support 4 is a carbon-based thermosetting resin. It is therefore able to be carbonized, i.e. to be transformed into carbon by a suitable heat treatment. The resin is preferably an epoxy resin or a phenol-formaldehyde-based resin. Advantageously, it is possible to use resin-impregnated paper supports available on the market. These supports are inexpensive. Advantageously, the tubes used can have a diameter or a side of 1 to 4 mm and a wall with a thickness of about 0.1 mm.

Figure 3:
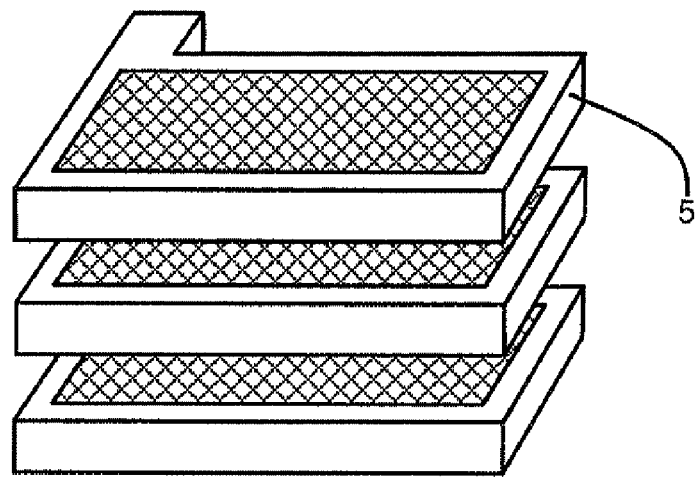

Temporary support 4 is then placed in a mould to form outer frame 2 using a mixture comprising at least one carbon-based thermosetting resin. Advantageously, the mixture further comprises carbon and a solvent. The inlets-outlets of pores 1a are advantageously previously closed so as to prevent the mixture used to form outer frame 2 from entering the pores. Closing is achieved for example by sticking a plate onto the ends of the pores. The resin of the mixture is preferably the same as that used to impregnate temporary support 4, which greatly simplifies the production method. The carbon of the mixture can for example be in the form of fibers. The concentration of the carbon fibers then preferably varies from 1 to 10% of the weight of resin used, and the concentration of the solvent then varies from 5 to 15% of the weight of the resin. The carbon fibres can also be replaced by particles. These additives enable fast subsequent carbonization without creating defects in the outer frame. The resins are then hardened either by the presence of a hardening agent or by heating to 60° C., or by a combination of these two actions. Support 4 covered by its frame is then taken out of the mould, and is then sliced to the required thickness to form grids 5 (FIG. 3). Slicing is for example performed by means of a band saw or any similar equipment.

Grids 5 formed in this way undergo heat treatment in an inert atmosphere at a temperature enabling carbonization of the materials. During this step, the carbon-based thermosetting resin of structure 1 and that of the mixture used for frame 2 are transformed into carbon, which is conductive, having an excellent chemical resistance and mechanical strength. The temperature is advantageously about 1000 to 1100° C. and the carbon obtained is in particular vitreous carbon.

A deposit of lead or of a lead-based alloy has to cover all of grids 5. The layer deposited on each grid 5 is preferably made from pure lead or a tin and lead-based alloy (weight of tin: 1.5 to 2% of the total weight), depending on the desired type of electrode (positive or negative). Preferably, a positive electrode is covered by a deposit of lead and tin with a thickness of 100 to 200 μm and a negative electrode is covered by a deposit of pure lead with a thickness of 20 to 40 μm. The deposition ensures good adhesion of the active material and protection of the carbon surface against oxidation. Deposition is preferably performed by electrodeposition, which enables deposition on large surfaces and non-porous depositions. A pasting step is then performed, whereby pores 1a of grid 5 are able to be filled by a suitable active material according to the desired type of electrode (positive or negative). The paste comprises at least a mixture of lead or of lead oxide, sulphuric acid and water. The thickness of the lead-based paste is preferably from 100 to 300 μm. As the pores are ordered and homogeneous, the distribution of the active material in the pores is also homogeneous. Structure 1, which is ordered, enables usual equipment to be used to perform the pasting step. The paste easily fills pores 1a with a size (diameter or side) of 1 to 4 mm and structure 1 offers excellent retention of the paste. With a pore dimension of 1 to 4 mm and a thickness of the walls of 0.1 to 0.5 mm comprising the thickness of the alloy coating, the utilisation factor of the active material is 70 to 80%.

Production of a porous carbon structure by means of a temporary support made from resin-impregnated paper has already been described in U.S. Pat. No. 3,825,460. However, the carbon structure described in U.S. Pat. No. 3,825,460 would not be directly usable as electrode for a lead-acid battery. The current transport capacity on the perimeter of this structure is in fact not sufficient to collect all of the current generated in the structure. Furthermore, due to the presence of the ordered network of pores, the structure has anisotropic mechanical properties. This structure is in fact resistant to compression in a direction parallel to the through-pores, but would not resist a flexional stress. Such a structure is therefore according to the invention consolidated by an outer frame, formed around its outer side walls. This frame further presents the advantage of being made from carbon, thereby lightening the electrode, and of also being easy to produce. Outer frame 2 preferably has a square cross-section of 2×2 mm to 4×4 mm, which is sufficient to ensure both mechanical strength and efficient current collection.

Figure 4:
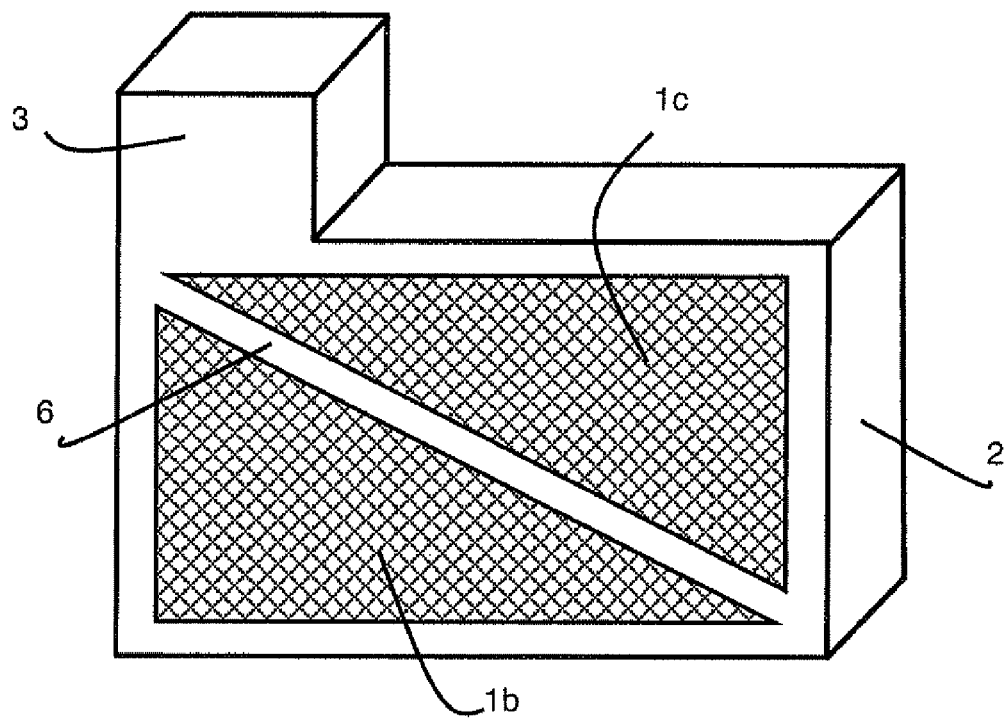
FIG. 4 represents an alternative embodiment of an electrode according to the invention.

In the particular embodiment represented in FIG. 4, structure 1 is preferably divided into smaller elementary structures, 1*b* and 1*c* in FIG. 4, separated by a carbon-based inner frame 6. This embodiment is advantageous in the case of electrodes of large dimensions where the ohmic resistance at the center of structure 1 can limit the performances of the cell, and slicing may give rise to physical defects in the structure. In such cases, temporary support 4 is then preferably divided into several blocks. Spaces are left in the mould between the blocks, which are then filled by the same mixture as the one used to produce outer frame 2, in order to form inner frame 6.

Figure 5:
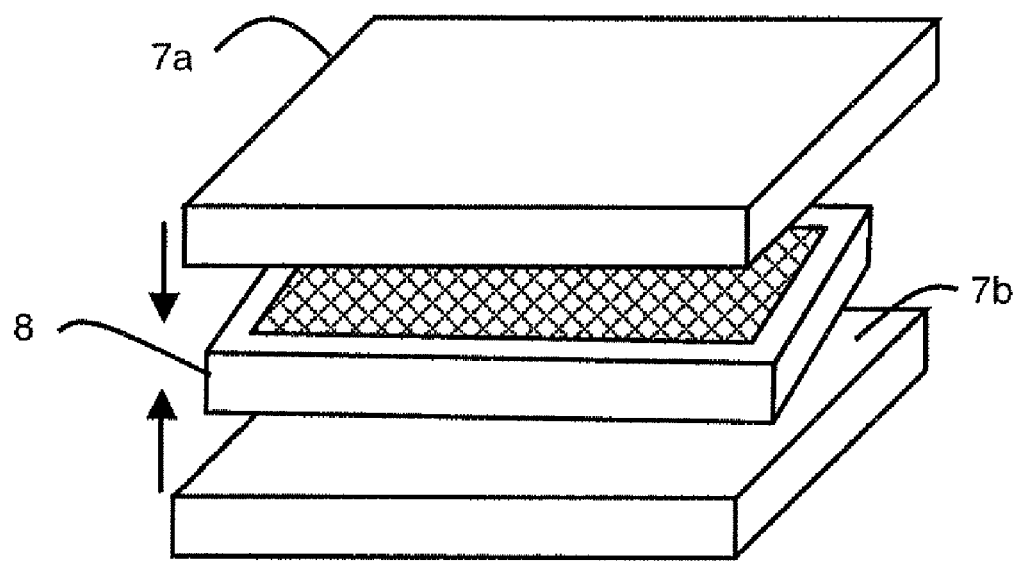
FIG. 5 represents a stack of AGM separators and an electrode according to the invention.

An electrode according to the invention described in the foregoing enables assembly of Valve-Regulated Lead-Acid Batteries (VRLA), and unlike the prior art, of batteries with separators of AGM type. FIG. 5 illustrates an assembly of an electrode 8 according to the invention (for example that of FIG. 1) with two AGM separators 7*a* and 7*b*. The separators exert a compressive force on electrode 8. The walls of the pores and those of separators 7*a* and 7*b* confine the active material and prevent changes of volume of the active material. In this way, the interface between the carbon structure and the active material remains and the active material preserves its integrality.

The invention claimed is:

1. An electrode for a lead-acid battery comprising:
   at least one carbon-based porous structure with parallel main faces and lateral faces, the porous structure being covered by a lead or lead-based alloy layer and comprising an ordered network of homogeneous through-pores perpendicular to said main faces and filled with a lead-based paste, and
   a carbon-based outer frame surrounding the lateral faces of the porous structure and covered by a lead or lead-based alloy layer.

2. The electrode according to claim 1, wherein the outer frame is made from vitreous carbon.

3. The electrode according to claim 1, wherein the porous structure is made from vitreous carbon.

4. The electrode according to claim 1, wherein the network of pores is in the form of a honeycomb.

5. The electrode according to claim 1, wherein the pores have a size of 1 to 4 mm.

6. The electrode according to claim 1, wherein the porous structure is divided into at least two parts by a carbon-based inner frame.

7. A production method of an electrode according to claim 1, successively comprising:
   production of a temporary support comprising said ordered network of pores, impregnated with at least a first carbon-based thermosetting resin,
   formation of the outer frame around said temporary support, by moulding of a mixture comprising at least a second carbon-based thermosetting resin, and hardening of said mixture,
   slicing the assembly formed by the temporary support surrounded by the outer frame,
   heat treatment in an inert atmosphere of said assembly, carbonizing the materials of the assembly,
   deposition of a layer of lead or lead-based alloy on all the surfaces of the assembly, and
   filling the pores of the porous structure obtained after heat treatment by means of a lead-based paste constituting the active material of the battery.

8. The method according to claim 7, wherein the temporary support is made from paper.

9. The method according to claim 7, wherein the first and second carbon-based thermosetting resins are identical.

10. The method according to claim 7, wherein the mixture comprises carbon fibers or particles and a solvent.

11. The method according to claim 7, wherein deposition of the lead or lead-based alloy layer is performed by electrodeposition.

\* \* \* \* \*